United States Patent
Nakamoto et al.

(10) Patent No.: US 10,622,679 B2
(45) Date of Patent: Apr. 14, 2020

(54) METHOD FOR MANUFACTURING FLUORIDE ION CONDUCTING ELECTROLYTE SOLUTION AND METHOD FOR MANUFACTURING FLUORIDE ION BATTERY

(71) Applicants: Hirofumi Nakamoto, Kyoto (JP); Jun-ichi Yamaki, Kyoto (JP); Zempachi Ogumi, Kyoto (JP)

(72) Inventors: Hirofumi Nakamoto, Kyoto (JP); Jun-ichi Yamaki, Kyoto (JP); Zempachi Ogumi, Kyoto (JP)

(73) Assignees: TOYOTA JIDOSHA KABUSHIKI KAISHA, Toyota (JP); KYOTO UNIVERSITY, Kyoto-shi (JP)

( * ) Notice: Subject to any disclaimer, the term of this patent is extended or adjusted under 35 U.S.C. 154(b) by 289 days.

(21) Appl. No.: 15/033,820

(22) PCT Filed: Dec. 1, 2014

(86) PCT No.: PCT/JP2014/081757
§ 371 (c)(1),
(2) Date: May 2, 2016

(87) PCT Pub. No.: WO2015/093272
PCT Pub. Date: Jun. 25, 2015

(65) Prior Publication Data
US 2016/0285129 A1    Sep. 29, 2016

(30) Foreign Application Priority Data
Dec. 18, 2013  (JP) .................. 2013-261211

(51) Int. Cl.
*H01M 10/0568* (2010.01)
*H01M 10/05* (2010.01)
*H01M 6/16* (2006.01)
*H01M 10/056* (2010.01)

(52) U.S. Cl.
CPC ....... *H01M 10/0568* (2013.01); *H01M 6/166* (2013.01); *H01M 10/05* (2013.01); *H01M 10/056* (2013.01); *H01M 2300/0017* (2013.01)

(58) Field of Classification Search
CPC .............. H01M 10/05; H01M 10/056; H01M 10/0568; H01M 2300/0017; H01M 6/166
See application file for complete search history.

(56) References Cited

U.S. PATENT DOCUMENTS

| | | | |
|---|---|---|---|
| 6,403,266 B1 * | 6/2002 | Kim ................ | H01M 6/164 429/314 |
| 2011/0031105 A1 * | 2/2011 | Miyanaga ............... | C01B 25/37 204/157.43 |
| 2013/0122361 A1 * | 5/2013 | Yazami ................ | H01M 4/38 429/199 |
| 2016/0218390 A1 * | 7/2016 | Yamada ............... | H01M 4/485 |

FOREIGN PATENT DOCUMENTS

| | | |
|---|---|---|
| CN | 102522592 A | 6/2012 |
| JP | H05-325973 A | 12/1993 |
| JP | 2013-145758 A | 7/2013 |
| WO | 2012/087414 A2 | 6/2012 |

* cited by examiner

Primary Examiner — Lingwen R Zeng
(74) Attorney, Agent, or Firm — Oliff PLC (57) ABSTRACT

A method for manufacturing a fluoride ion conducting electrolyte solution which can improve ionic conductivity includes a step of heating a fluoride and/or a solvent when the fluoride and the solvent are mixed, wherein a heating temperature at the step is lower than a temperature at which the solvent decomposes.

10 Claims, 5 Drawing Sheets

METHOD FOR MANUFACTURING FLUORIDE ION CONDUCTING ELECTROLYTE SOLUTION AND METHOD FOR MANUFACTURING FLUORIDE ION BATTERY

TECHNICAL FIELD

The present invention relates to fluoride ion conducting electrolyte solutions which can improve ionic conductivity.

BACKGROUND ART

Fluoride ion batteries are one type of primary batteries and secondary batteries, and various researches thereon have been carried out. In fluoride ion batteries, electrolytes (electrolyte solutions) which can conduct fluoride ions are used. For example, Patent Literature 1 discloses an electrolyte solution in which fluoride salts are dissolved in a solvent. Patent Literature 2 discloses a fluoride ion conducting solid electrolyte. Patent Literature 3 discloses an electrolyte solution in which fluoride salts are dissolved in different kinds of organic solvents.

CITATION LIST

Patent Literature

Patent Literature 1: JP 2013-145758 A
Patent Literature 2: JP H05-325973 A
Patent Literature 3: WO 2012/087414

SUMMARY OF INVENTION

Technical Problem

In the conventional techniques, ionic conductivities at fluoride ion electrolytes are insufficient, and for example in a case where the fluoride ion electrolytes are applied to fluoride ion batteries, sometimes sufficient performance cannot be obtained. An object of the present invention is to provide a fluoride ion conducting electrolyte solution which can improve the ionic conductivity.

Solution to Problem

Through intensive researches, the inventors of the present invention found that: in fluoride ion electrolyte solutions, sufficient ionic conductivity cannot be obtained because fluoride salts have strong ion binding properties and ionic dissociation is difficult to progress. As a result of further intensive researches based on the finding, the inventors of the present invention found that: in manufacturing an electrolyte solution, it is possible to make the ionic dissociation progress and to improve the conductivity of negative ions (fluoride ions) in the electrolyte solution, by heating a fluoride and a solvent when they are mixed.

The present invention has been completed on the basis of the above findings. That is, a first aspect of the present invention is a method for manufacturing a fluoride ion conducting electrolyte solution, the method including a step of heating a fluoride and/or a solvent when the fluoride and the solvent are mixed, wherein a heating temperature at the step is lower than a temperature at which the solvent decomposes.

In the present invention, "heating a fluoride and/or a solvent when the fluoride and the solvent are mixed" includes a state where a heating is carried out while a fluoride and a solvent are mixed, a state where a fluoride is mixed in a heated solvent, and a state where a heated fluoride is mixed in a solvent. That is, the present invention includes all states where a heating is carried out for the purpose of making the temperature of a solvent and fluoride in mixing higher than the ambient temperature.

In the first aspect of the present invention, it is preferable that the heating temperature is higher than 24° C.

A second aspect of the present invention is a method for manufacturing a fluoride ion battery, the method including a step of arranging, between a cathode and an anode, an electrolyte layer including the fluoride ion conducting electrolyte solution obtained by the method according to the first aspect of the present invention.

Advantageous Effects of Invention

According to the present invention, it is possible to increase the ion concentration in an electrolyte solution and to improve the conductivity of negative ions (fluoride ions) in the electrolyte solution, by making the ionic dissociation of fluorides progress by a heating.

DESCRIPTION OF EMBODIMENTS

1. Method for Manufacturing Fluoride Ion Conducting Electrolyte Solution

The features of the method for manufacturing a fluoride ion conducting electrolyte solution according to the present invention are: the method includes the step of heating a fluoride and/or a solvent when the fluoride and the solvent are mixed; and the heating temperature at the step of heating the fluoride and/or the solvent is made lower than the temperature at which the solvent decomposes.

The "fluoride" used in the present invention is not limited as long as the fluoride dissolves in a solvent to dissociate fluoride ions, and can provide a fluoride ion conductivity. For example, inorganic fluoride salts and organic fluoride salts can be used.

Examples of the inorganic fluoride salts include fluorides represented by $MF_n$ (M is metal, and n is an integer larger than 0), and specifically include alkali metal fluorides such as LiF, CsF, RbF, KF, NaF, alkaline-earth metal fluorides such as $MgF_2$, $BaF_2$, $CaF_2$, $SrF_2$, and transition metal fluorides such as $CoF_3$, $CuF_2$, $FeF_2$, $FeF_3$, $AlF_3$, $SnF_2$, $AgF$, and $AgF_2$. Among them, alkali metal fluorides, CsF, KF and LiF are preferable, and CsF is especially preferable.

Examples of the organic fluoride salts include:

organic ammonium fluorides such as tetramethylammonium fluoride, neopentyltrimethylammonium fluoride, trineopentylmethylammonium fluoride, tetraneopentylammonium fluoride, 1-adamantyltrimethylammonium fluoride, phenyltrimethylammonium fluoride, and 1,2-bis(dimethylamino)-1,2-bis(dimethylammonium)ethylendifluoride;

guanidium fluorides such as hexamethylguanidium fluoride;

piperidinium fluorides such as 1,3,3,6,6-hexamethylpiperidinium fluoride, and poly(1,1-dimethyl-3,5-dimethylenepiperidinium)fluoride;

tetramine fluorides such as 1-methylhexamethylenetetramine fluoride;

organic phosphonium fluorides such as tetramethylphosphonium fluoride, tetraphenylphosphonium fluoride, and phenyltrimethylphosphonium fluoride; and organic sulfonium fluorides such as trimethylsulfonium fluoride and tri(dimethylamino)sulfoniumdifluorotrimethylsilicate.

Among them, organic ammonium fluorides are preferable, and tetramethylammonium fluoride, neopentyltrimethylammonium fluoride and tetraneopentylammonium fluoride are especially preferable.

The "solvent" used in the present invention is not limited as long as the solvent can dissolve the above-described fluorides. Water, various kinds of organic solvents, ionic liquids and the like can be used as the solvent. Specific examples include:

water;

alcohols such as ethanol and ethylene glycol;

ketones such as acetone, methylisobutylketone, and methylethylketone;

nitriles such as acetonitrile, benzonitrile, 4-fluorobenzonitrile, and pentafluorobenzonitrile;

amines such as triethylamine and diisopropylethylamine;

ethers such as dimethoxyethane, ethylenglycoldimethylether, diethyleneglycoldimethylether, triethyleneglycoldimethylether, and tetraethyleneglycoldimethylether;

carbonates such as ethylene carbonate, propylene carbonate, dimethyl carbonate, diethyl carbonate, methylethyl carbonate, and propylmethyl carbonate;

esters such as ethyl acetate, methyl butyrate, propyl acetate, methyl propionate, methyl formate, and 2-methoxyethyl acetate;

furans such as tetrahydrofuran and 2-methyltetrahydrofuran;

lactones such as γ-butyrolactone;

nitro compounds such as nitromethane;

aromatic compounds such as benzene, toluene, and hexafluorobenzene;

alkyl halides such as chloroform, dichloromethane, and 1,2-dichloroethane;

sulfur compounds such as dimethyl sulfoxide, sulfolane, carbon disulfide, ethylmethylsulfonate, trimethylenesulfonate, 1-methyltrimethylenesulfonate, ethyl-sec-butyl sulfonate, ethylisopropylsulfonate, 3,3,3-trifluoropropylmethylsulfonate, and 2,2,2-trifluoroethylsulfonate;

amides such as N,N-dimethylformamide, N,N-dimethylacetamide, hexamethylphosphoramide, and hexamethylphosphorustriamide;

oxolanes such as 4-methyl-1,3-dioxolane;

heterocyclic compounds such as pyridine;

pyrrolidones such as 1-methyl-2-pyrrolidone (N-methylpyrrolidone);

borate compounds such as trimethyl borate and triethyl borate;

phosphoric acid ester compounds such as trimethyl phosphate and tri-n-propylphosphate;

chain ammonium based ionic liquids such as trimethylbutylammonium-bis(trifluoromethanesulfonyl)amide, trimethylbutylammonium-bis(fluorosulfonyl)amide, trimethylbutylammonium-bis(trifluoromethanesulfonyl)amide, trimethylbutylammonium-tri(pentafluoroethyl)trifluorophosphate, trimethylbutylammonium-trifluoromethanesulfonate, trimethylbutylammonium-tetrafluoroborate, trimethylbutylammonium-hexafluorophosphate, N,N-diethyl-N-methylmethoxyethylammonium-bis(trifluoromethanesulfonyl)amide, N,N-diethyl-N-methylmethoxyethylammonium-bis(fluorosulfonyl)amide, N,N-diethyl-N-methylmethoxyethylammonium-tri(pentafluoroethyl) trifluorophosphate, N,N-diethyl-N-methylmethoxyethylammonium-trifluoromethanesulfonate, N,N-diethyl-N-methylmethoxyethylammonium-tetrafluoroborate, and N,N-diethyl-N-methylmethoxyethylammonium-hexafluorophosphate;

cyclic ammonium based ionic liquids such as N-methyl-N-propylpiperidinium-bis(trifluoromethanesulfonyl)amide, N-methyl-N-propylpiperidinium-bis(fluorosulfonyl)amide, N-methyl-N-propylpiperidinium-bis(trifluoromethanesulfonyl)amide, N-methyl-N-propylpiperidinium-tri(pentafluoroethyl)trifluorophosphate, N-methyl-N-propylpiperidinium-trifluoromethanesulfonate, N-methyl-N-propylpiperidinium-tetrafluoroborate, N-methyl-N-propylpiperidinium-hexafluorophosphate, 1-methoxyethyl-1-methylpyrrolidinium-bis(trifluoromethanesulfonyl)amide, 1-methoxyethyl-1-methylpyrrolidinium-bis(fluorosulfonyl)amide, 1-methoxyethyl-1-methylpyrrolidinium-tri(pentafluoroethyl)trifluorophosphate, 1-methoxyethyl-1-methylpyrrolidinium-trifluoromethanesulfonate, 1-methoxyethyl-1-methylpyrrolidinium-tetrafluoroborate, and 1-methoxyethyl-1-methylpyrrolidinium-hexafluorophosphate;

aromatic ionic liquids such as 1-ethyl-3-methylimidazolium-bis(trifluoromethanesulfonyl)amide, 1-ethyl-3-methylimidazolium-bis(fluorosulfonyl)amide, 1-ethyl-3-methylimidazolium-bis(trifluoromethanesulfonyl)amide, 1-ethyl-3-methylimidazolium-tri(pentafluoroethyl)trifluoro- phosphate, 1-ethyl-3-methylimidazolium-trifluoromethanesulfonate, 1-ethyl-3-methylimidazolium-tetrafluoroborate, 1-ethyl-3-methylimidazolium-hexafluorophosphate, 1-ethylpyridinium-bis(trifluoromethanesulfonyl)amide, 1-ethylpyridinium-bis(fluorosulfonyl)amide, 1-ethylpyridinium-tri(pentafluoroethyl)trifluorophosphate, 1-ethylpyridinium-trifluoromethanesulfonate, 1-ethylpyridinium-tetrafluoroborate, and 1-ethylpyridinium-hexafluorophosphate;

phosphonium-based ionic liquids such as tetrabutylphosphonium-bis(trifluoromethanesulfonyl)amide, tetrabutylphosphonium-bis(fluorosulfonyl)amide, tetrabutylphosphonium-bis(trifluoromethanesulfonyl)amide, tetrabutylphosphonium-tri(pentafluoroethyl)trifluorophosphate, tetrabutylphosphonium-trifluoromethanesulfonate, tetrabutylphosphonium-tetrafluoroborate, tetrabutylphosphonium-hexafluorophosphate, triethyl-(2-methoxyethyl)phosphonium-bis(trifluoromethanesulfonyl)amide, triethyl-(2-methoxyethyl)phosphonium-bis(fluorosulfonyl)amide, triethyl-(2-methoxyethyl)phosphonium-tri(pentafluoroethyl)trifluorophosphate, triethyl-(2-methoxyethyl)phosphonium-trifluoromethanesulfonate, triethyl-(2-methoxyethyl)phosphonium-tetrafluoroborate, and triethyl-(2-methoxyethyl)phosphonium-hexafluorophosphate;

sulfonium-based ionic liquids such as triethylsulfonium-bis(trifluoromethanesulfonyl)amide, triethylsulfonium-bis(fluorosulfonyl)amide, triethylsulfonium-bis(trifluoromethanesulfonyl)amide, triethylsulfonium-tri(pentafluoroethyl)trifluorophosphate, triethylsulfonium-trifluoromethanesulfonate, triethylsulfonium-tetrafluoroborate, triethylsulfonium-hexafluorophosphate, diethyl-(2-methoxyethyl)sulfonium-bis(trifluoromethanesulfonyl)amide, diethyl-(2-methoxyethyl)sulfonium-bis(fluorosulfonyl)amide, diethyl-(2-methoxyethyl)sulfonium-tri(pentafluoroethyl)trifluorophosphate, diethyl-(2-methoxyethyl)sulfonium-trifluoromethanesulfonate, diethyl-(2-methoxyethyl)sulfonium-tetrafluoroborate, and diethyl-(2-methoxyethyl)sulfonium-hexafluorophosphate.

Among them, carbonates, ethers, sulfur compounds, phosphoric acid ester compounds, aromatic ionic liquids, chain ammonium based ionic liquids are preferably used, and propylene carbonate and trimethyl phosphate are especially preferably used, in view of inhibiting volatilization and having good heat resistance properties (having high decomposition temperatures).

In the present invention, the fluoride as described above and a solvent are mixed, and the fluoride is dissolved in the solvent. The mixing ratio of the fluoride and the solvent are not particularly limited. The lower limit of the fluoride concentration in the solvent is preferably no less than 0.01 mol/kg, more preferably no less than 0.05 mol/kg, and further preferably no less than 0.1 mol/kg. The upper limit is preferably 10 mol/kg, more preferably 5 mol/kg, and further preferably 2 mol/kg. It is noted that, the entire fluoride does not have to dissolve completely in the solvent. Part of the fluoride may remain undissolved.

In the present invention, a known method can be used as the method for mixing the fluoride and the solvent. For example, the fluoride and the solvent may be stirred to be mixed in a container. It is preferable that the fluoride and the solvent are mixed in a sealed container, in view of inhibiting volatilization of the solvent.

In the present invention, the above-described fluoride and/or the solvent are heated when the fluoride and the solvent are mixed. As a specific state, (1) a state where the fluoride and the solvent are heated while mixed, at a temperature lower than the temperature at which the solvent decomposes, (2) a state where the fluoride is added in the solvent heated to a temperature lower than the decomposition temperature and they are mixed, (3) a state where the fluoride heated to a temperature lower than the decomposition temperature of the solvent is added to the solvent and they are mixed, or the like can be given. Among them, the state where the fluoride and the solvent are heated while mixed, at a temperature lower than the temperature at which the solvent decomposes is preferable, in view of easy temperature control and having a further remarkable effect. By carrying out the mixing and the heating at the same time, the contact frequency of the fluoride where ions are dissociated and the solvent gets high, whereby it gets easy in a short time to keep the state of the fluoride where ions are dissociated. In the present invention, in any cases of (1) to (3), the temperatures of the solvent and the fluoride in the mixing are adjusted to be higher than the ambient temperature.

In the present invention, a known method can be used as the method for heating the fluoride and/or the solvent. For example, the fluoride and the solvent can be heated by a heating of a container where the fluoride and the solvent are, from the outside of the container by means of a heater and the like. It is preferable that the fluoride and the solvent are heated in a sealed container, in view of inhibiting volatilization of the solvent.

The heating temperature is not limited as long as the heating temperature is lower than the decomposition temperature of the solvent, and adequately determined according to the kind of the solvent to be used. While depending on the kind of the solvent to be used, the lower limit of the heating temperature is preferably higher than 24° C., more preferably no less than 40° C., and further preferably no less than 60° C. The upper limit of the heating temperature is preferably no more than 150° C., and more preferably no more than 100° C. By having the heating temperature like this, it is possible to make the dissociation of the fluoride further progress while inhibiting the decomposition of the solvent. Therefore the ionic conductivity further improves.

The mixing time (or the heating time) is adequately determined according to the kinds of the fluoride and the solvent to be used, and even a short mixing time can provide a sufficient effect. While depending on the kinds of the fluoride and the solvent to be used, the lower limit is preferably no less than 10 minutes and more preferably no less than 30 minutes, and the upper limit is preferably no more than 24 hours and more preferably no more than 10 hours.

In the present invention, with the above-described fluoride and the solvent, "other components" can be included in the electrolyte solution, within the range where the effect of the present invention is not obstructed. For example, anion receptors which can coordinate fluoride ions, or cation receptors which can coordinate metal ions of fluoride salts can be included. Examples of the anion receptors include fluorinated-boron-based compounds such as fluorinated borane, fluorinated boronate and fluorinated borate. Examples of the cation receptors include crown ethers, lariat ethers, metallacrown ethers, calixcrowns, tetrathiafulvalene crowns, calixarenes, calixarenediquinones, tetrathiafulvalenes, and bis(calixcrown)tetrathiafulvalens.

The above-described other components may be added in the fluoride and the solvent when the fluoride and the solvent are mixed, of may be added in the fluoride and the solvent after the fluoride and the solvent are mixed and heated.

When a fluoride ion conducting electrolyte solution is manufactured by a conventional way, the mixing and the adjustment of a fluoride salt and a solvent are generally carried out at around a room temperature (20° C.), in order to inhibit the volatilization and decomposition of the solvent. However, according to the findings of the inventors of the present invention, fluoride salts are salts having strong ion binding properties, and their ionic dissociation is difficult to progress in a mixing at a room temperature. Thus, the electrolyte solution manufactured by a conventional way does not have a sufficient fluoride ionic conductivity, and a sufficient performance is not always obtained in cases where the electrolyte solution is applied to fluoride ion batteries. Regarding this point, the present invention dares to employ a step which goes against conventional techniques, the step where a heating is carried out when a fluoride and solvent are mixed. Whereby the present invention can promote the ionic dissociation of the fluoride, and can improve the fluoride ionic conductivity of the electrolyte solution. In the present invention, where the upper limit of the heating temperature is lower than the decomposition temperature of the solvent, the electrolyte solution is safe from deterioration. In addition, as shown in Examples described later, the improvement effect of the ionic conductivity provided by the present invention continues even after the heating of the electrolyte solution is finished and the electrolyte solution is cooled to a room temperature. That is, the electrolyte solution obtained by the present invention can provide a sufficient ionic conductivity even in operation environments of fluoride ion batteries. As described above, according to the present invention, a method for manufacturing an electrolyte solution which can improve the fluoride ionic conductivity is provided.

2. Method for Manufacturing Fluoride Ion Battery

The above-described fluoride ion conducting electrolyte solution is especially preferably used as an electrolyte solution of fluoride ion batteries. That is, the present invention has an aspect of a method for manufacturing a fluoride ion battery. Specifically it is a method for manufacturing a fluoride ion battery including a step of arranging an electrolyte layer containing the fluoride ion conducting electrolyte solution obtained by the above-described manufacturing method, between a cathode and an anode.

The cathode and anode in the fluoride ion battery can be formed of known materials which can accommodate and release fluoride ions.

The electrolyte layer is a layer where the above-described fluoride ion conducting electrolyte solution is to be kept. For example, the electrolyte layer can be formed by impregnating a known separator and the like with the fluoride ion conducting electrolyte solution.

The fluoride ion battery can be made by: housing the electrolyte layer, the cathode, and the anode in a battery case in a manner to arrange the electrolyte layer between the cathode and anode; and adequately attaching terminals and the like thereto. The battery can be a laminated battery in which plurality of electrolytes, cathodes, and anodes are laminated, or, plurality of fluoride ion batteries can be stacked.

With the method for manufacturing a fluoride ion battery according to the present invention, the fluoride ionic conductivity of the electrolyte solution to be used in the electrolyte layer is improved. Therefore, with the method, it is possible to manufacture a fluoride ion battery having excellent performances, whose current density and the like are increased. The fluoride ion battery manufactured by the present invention can be used as a primary battery and a secondary battery.

EXAMPLES

Hereinafter, the method for manufacturing a fluoride ion conducting electrolyte solution according to the present invention will be described based on Examples. However, the present invention is not limited to the following specific forms.

1. Making of Fluorine Ion Conducting Electrolyte Solution

Example 1

Cesium fluoride (manufactured by Aldrich) was weighed so as to be 0.1 mol/kg to propylene carbonate (manufactured by Kishida Chemical Co., Ltd.). The weighed cesium fluoride and the propylene carbonate were mixed. The resultant material was stirred for 1 hour while heated to 80° C. in a sealed container of fluorine resin, whereby a fluorine ion conducting electrolyte solution according to Example 1 was obtained.

Example 2

Tetramethylammonium fluoride (manufactured by Aldrich) was weighed so as to be 0.1 mol/kg to propylene carbonate (manufactured by Kishida Chemical Co., Ltd.). The weighed tetramethylammonium fluoride and the propylene carbonate were mixed. The resultant material was stirred for 1 hour while heated to 80° C. in a sealed container of fluorine resin, whereby a fluorine ion conducting electrolyte solution according to Example 2 was obtained.

Example 3

Tetramethylammonium fluoride (manufactured by Aldrich) was weighed so as to be 0.1 mol/kg to propylene carbonate (manufactured by Kishida Chemical Co., Ltd.). The weighed tetramethylammonium fluoride and the propylene carbonate were mixed. The resultant material was stirred for 5 hours while heated to 60° C. in a sealed container of fluorine resin, whereby a fluorine ion conducting electrolyte solution according to Example 3 was obtained.

Example 4

Tetramethylammonium fluoride (manufactured by Aldrich) was weighed so as to be 0.1 mol/kg to propylene carbonate (manufactured by Kishida Chemical Co., Ltd.). The weighed tetramethylammonium fluoride and the propylene carbonate were mixed. The resultant material was stirred for 8 hours while heated to 60° C. in a sealed container of fluorine resin, whereby a fluorine ion conducting electrolyte solution according to Example 4 was obtained.

Example 5

Tetramethylammonium fluoride (manufactured by Aldrich) was weighed so as to be 0.13 mol/kg to dimethyl sulfoxide (manufactured by Kishida Chemical Co., Ltd.). The weighed tetramethylammonium fluoride and the dimethyl sulfoxide were mixed. The resultant material was stirred for 1 hour while heated to 80° C. in a sealed container of fluorine resin, whereby a fluorine ion conducting electrolyte solution according to Example 5 was obtained.

Example 6

Tetramethylammonium fluoride (manufactured by Aldrich) was weighed so as to be 0.1 mol/kg to N-methylpyrrolidone (manufactured by Kishida Chemical Co., Ltd.). The weighed tetramethylammonium fluoride and the N-methylpyrrolidone were mixed. The resultant material was stirred for 1 hour while heated to 80° C. in a sealed container of fluorine resin, whereby a fluorine ion conducting electrolyte solution according to Example 6 was obtained.

Comparative Example 1

Cesium fluoride (manufactured by Aldrich) was weighed so as to be 0.1 mol/kg to propylene carbonate (manufactured by Kishida Chemical Co., Ltd.). The weighed cesium fluoride and the propylene carbonate were mixed. The resultant material was stirred for 60 hours at a room temperature (24° C.) in a sealed container of fluorine resin, whereby a fluorine ion conducting electrolyte solution according to Comparative Example 1 was obtained.

Comparative Example 2

Tetramethylammonium fluoride (manufactured by Aldrich) was weighed so as to be 0.1 mol/kg to propylene carbonate (manufactured by Kishida Chemical Co., Ltd.). The weighed tetramethylammonium fluoride and the propylene carbonate were mixed. The resultant material was stirred for 60 hours at a room temperature (24° C.) in a sealed container of fluorine resin, whereby a fluorine ion conducting electrolyte solution according to Comparative Example 2 was obtained.

Comparative Example 3

Tetramethylammonium fluoride (manufactured by Aldrich) was weighed so as to be 0.1 mol/kg to propylene carbonate (manufactured by Kishida Chemical Co., Ltd.). The weighed tetramethylammonium fluoride and the propylene carbonate were mixed. The resultant material was stirred for 160 hours at a room temperature (approximately 30° C.) in a sealed container of fluorine resin, whereby a fluorine ion conducting electrolyte solution according to Comparative Example 3 was obtained.

Comparative Example 4

Tetramethylammonium fluoride (manufactured by Aldrich) was weighed so as to be 0.13 mol/kg to dimethyl sulfoxide (manufactured by Kishida Chemical Co., Ltd.). The weighed tetramethylammonium fluoride and the dimethyl sulfoxide were mixed. The resultant material was stirred for 25 hours at a room temperature (approximately 30° C.) in a sealed container of fluorine resin, whereby a fluorine ion conducting electrolyte solution according to Comparative Example 4 was obtained.

Comparative Example 5

Tetramethylammonium fluoride (manufactured by Aldrich) was weighed so as to be 0.1 mol/kg to N-methylpyrrolidone (manufactured by Kishida Chemical Co., Ltd.). The weighed tetramethylammonium fluoride and the N-methylpyrrolidone were mixed. The resultant material was stirred for 25 hours at a room temperature (approximately 30° C.) in a sealed container of fluorine resin, whereby a fluorine ion conducting electrolyte solution according to Comparative Example 5 was obtained.

2. Evaluation of Ionic Conductivity

In a glovebox having an Ar atmosphere, the temperature of each fluorine ion conducting electrolyte solution of Examples 1 to 6 and Comparative Examples of 1 to 5 was made to be 25° C. of solution temperature in a thermostatic bath. After that, each ionic conductivity was measured by a conductivity meter (SevenGo pro, manufactured by Mettler-Toledo International Inc.). The results are shown in FIGS. 1 to 5.

Figure 1:
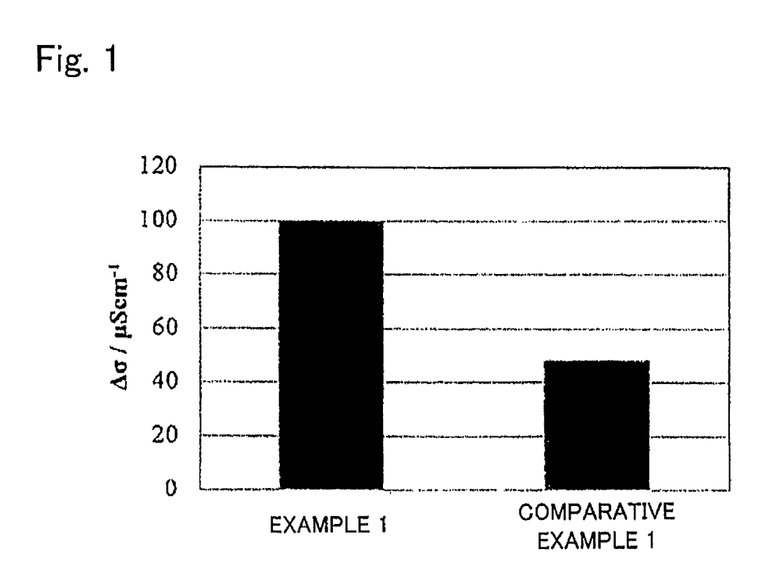
FIG. 1 is a graph showing ionic conductivities of fluoride ion conducting electrolyte solutions of Example 1 and Comparative Example 1.
Figure 2:
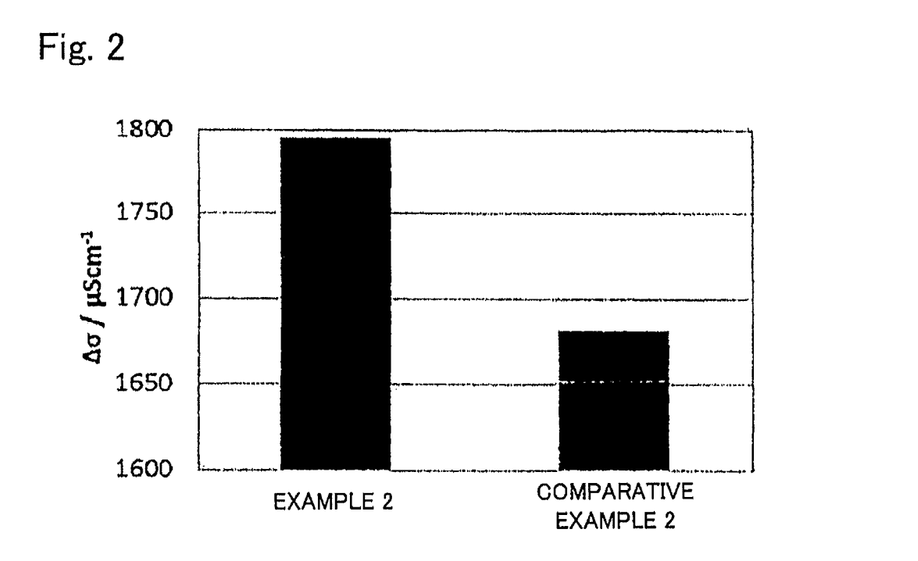
FIG. 2 is a graph showing ionic conductivities of fluoride ion conducting electrolyte solutions of Example 2 and Comparative Example 2.

As is obvious from the results shown in FIGS. 1 and 2, Examples where the heating was carried out when the fluoride and solvent were mixed had ionic conductivities significantly improved compared to the ionic conductivities of Comparative Examples where heating was not carried out (Example 1: $\Delta\sigma$=0.100 mS/cm, Comparative Example 1: $\Delta\sigma$=0.049 mS/cm, Example 2: $\Delta\sigma$=1.80 mS/cm, Comparative Example 2: $\Delta\sigma$=1.68 mS/cm). In a case where the heating was not carried out, the ionic conductivity of the electrolyte solution was low in spite of a long time of the stirring time of 60 hours. In contrast, In Example 1, it was possible to greatly improve the ionic conductivity with a short time of the stirring time of 1 hour. Further, a sufficient effect was confirmed in both cases of the case where an inorganic fluoride salt was used as the fluoride (Example 1), and the case where an organic fluoride salt was used as the fluoride (Example 2).

Figure 3:
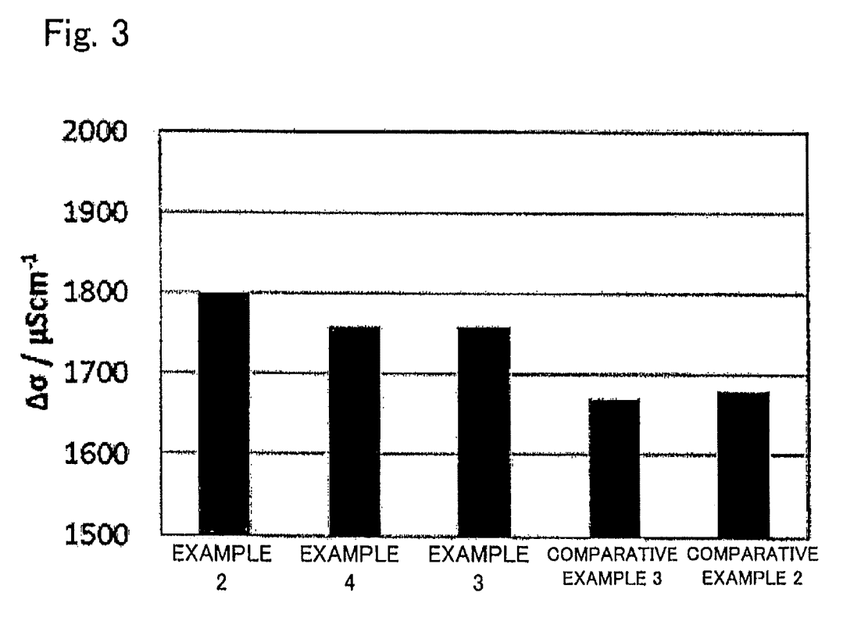
FIG. 3 is a graph showing ionic conductivities of fluoride ion conducting electrolyte solutions of Examples 2 to 4 and Comparative Examples 2 and 3.

In addition, as is obvious from the results shown in FIG. 3, Examples where the heating and stirring were carried out when the fluoride and solvent were mixed had ionic conductivities significantly improved compared to the ionic conductivities of Comparative Examples where only a long time stirring was carried out without a heating (Example 2: $\Delta\sigma$=1.80 mS/cm, Example 3: $\Delta\sigma$=1.76 mS/cm, Example 4: $\Delta\sigma$=1.76 mS/cm, Comparative Example 2: $\Delta\sigma$=1.68 mS/cm, Comparative Example 3: $\Delta\sigma$=1.67 mS/cm). From this results as well, it was figured out that the cause of the improvement in the ionic conductivity of the electrolyte solution was the heating, not the stirring time.

Figure 4:
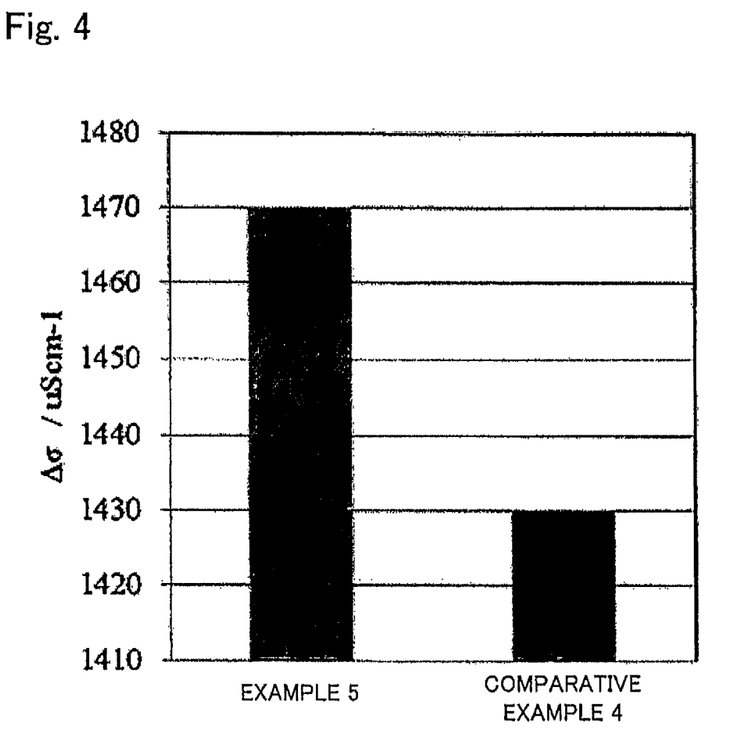
FIG. 4 is a graph showing ionic conductivities of fluoride ion conducting electrolyte solutions of Example 5 and Comparative Example 4.
Figure 5:
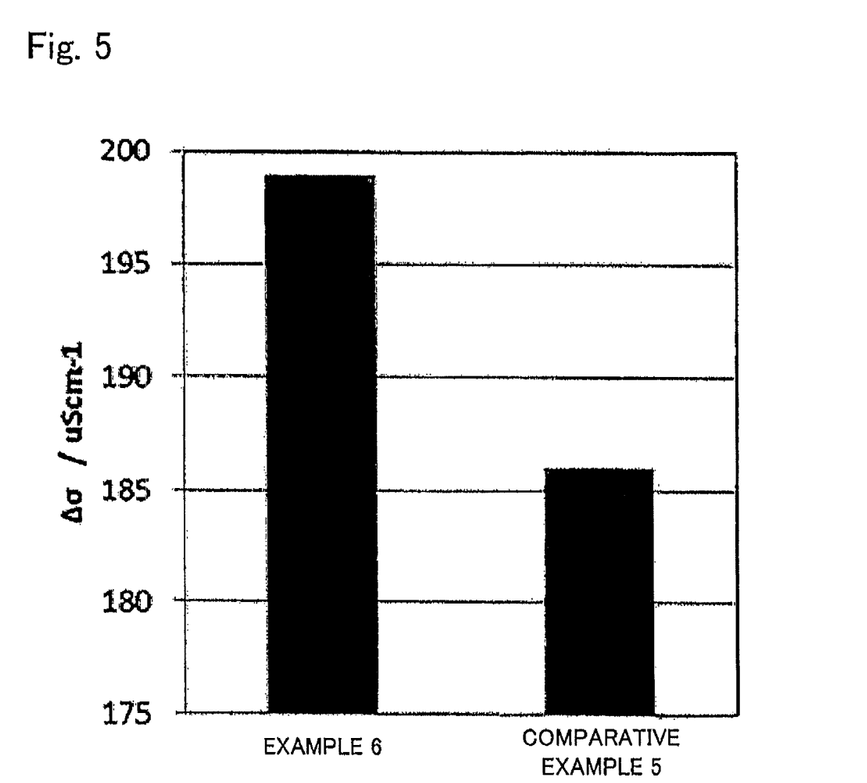
FIG. 5 is a graph showing ionic conductivities of fluoride ion conducting electrolyte solutions of Example 6 and Comparative Example 5.

Further, as is obvious from the results shown in FIGS. 4 and 5, the effect of improvement in the ionic conductivity by the heating was confirmed regardless of the kind of the solvent constituting the electrolyte solution (Example 5: $\Delta\sigma$=1.47 mS/cm, Comparative Example 4: $\Delta\sigma$=1.43 mS/cm, Example 6: $\Delta\sigma$=0.199 mS/cm, Comparative Example 5: $\Delta\sigma$=0.186 mS/cm).

That is, it was found that, in manufacturing an electrolyte solution by mixing a fluoride and a solvent, it is possible to promote the ionic dissociation of the fluoride in a short time and to improve the fluoride ionic conductivity of the electrolyte solution, by carrying out a heating at a temperature lower than the temperature at which the solvent decomposes, whether the fluoride is an inorganic salt or an organic salt, and regardless of the kind of the solvent.

INDUSTRIAL APPLICABILITY

The fluoride ion conducting electrolyte solution obtained by the present invention can be especially preferably used for an electrolyte solution of primary batteries and secondary batteries. The manufacturing method of the present invention can improve the performance of the electrolyte solution only by carrying out a heating. That is, the manufacturing method of the present invention, which can be carried out easily and has a significant effect, is considered to be very useful industrially.

The invention claimed is:

1. A method for manufacturing a fluoride ion battery, the method comprising:
    a step of arranging, between a cathode and an anode that are configured to accommodate and release fluoride ions and are suitable for the fluoride ion battery, an electrolyte layer including a fluoride ion conducting electrolyte solution obtained by:
        heating a mixture of at least one alkali metal fluoride and at least one organic solvent at a heating temperature that is no less than 60° C. and is lower than a temperature at which the solvent decomposes to manufacture the fluoride ion battery.

2. The method according to claim 1, wherein the heating temperature is no more than 150° C.

3. The method according to claim 1, wherein the heating temperature is no more than 100° C.

4. The method according to claim 1, wherein the electrolyte layer is impregnated with the fluoride ion conducting electrolyte.

5. The method according to claim 4, wherein the electrolyte layer further includes a separator which is impregnated with the fluoride ion conducting electrolyte.

6. The method according to claim 1, wherein the heating temperature is no more than 80° C.

7. The method according to claim 1, wherein the heating is performed for no less than 10 minutes and no more than 24 hours.

8. The method according to claim 1, wherein the heating is performed for no less than 30 minutes and no more than 24 hours.

9. The method according to claim 1, wherein the heating is performed for no less than 10 minutes and no more than 10 hours.

10. The method according to claim 1, wherein the heating is performed for no less than 30 minutes and no more than 10 hours.

* * * * *